Figure 1:
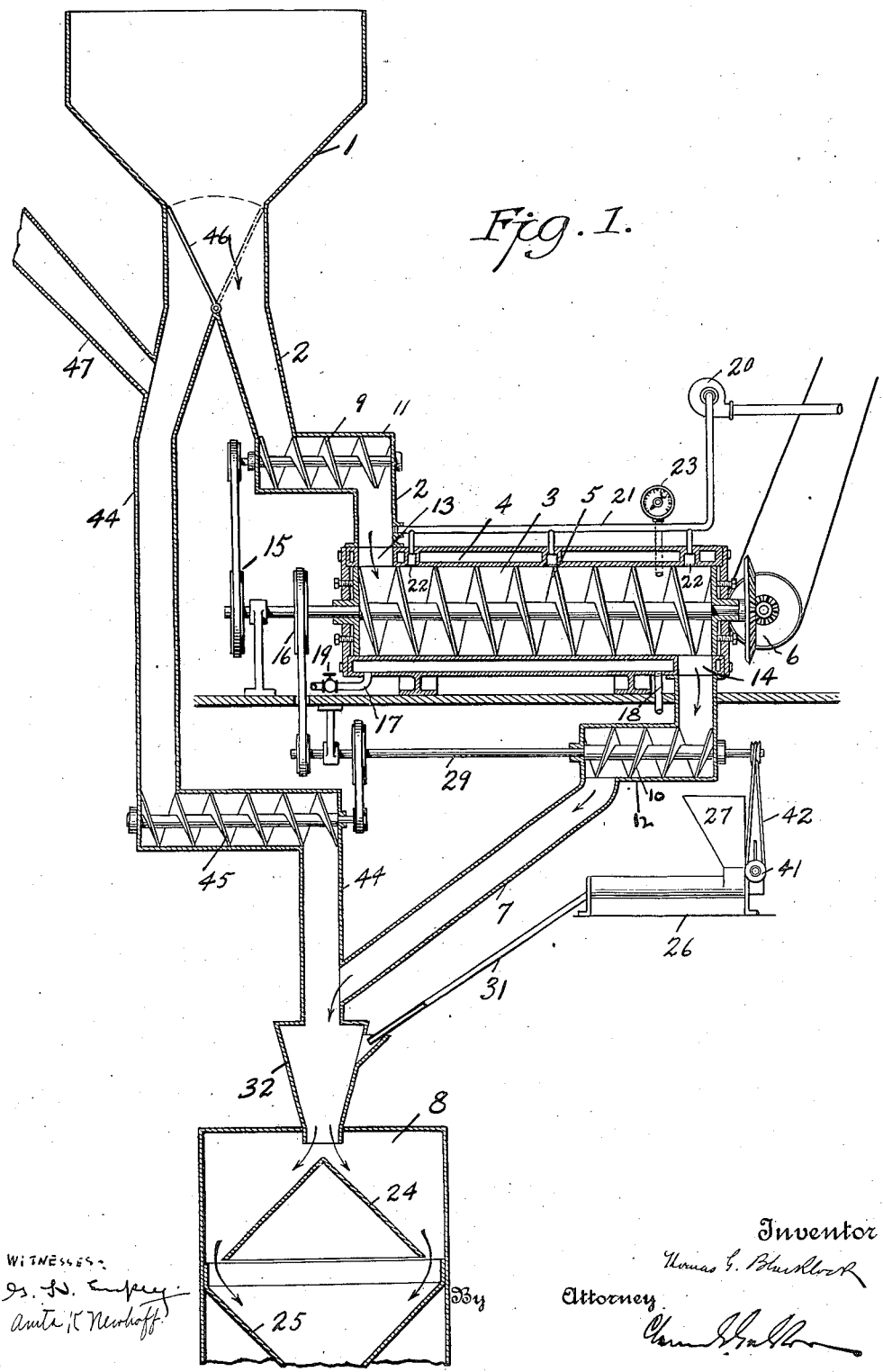

T. G. BLACKLOCK.
APPARATUS FOR TREATING CEREAL PRODUCTS.
APPLICATION FILED MAR. 24, 1916.

1,203,175.

Patented Oct. 31, 1916.
2 SHEETS—SHEET 1.

Witnesses:

Inventor
Thomas G. Blacklock
By
Attorney

T. G. BLACKLOCK.
APPARATUS FOR TREATING CEREAL PRODUCTS.
APPLICATION FILED MAR. 24, 1916.
1,203,175.
Patented Oct. 31, 1916.
2 SHEETS—SHEET 2.
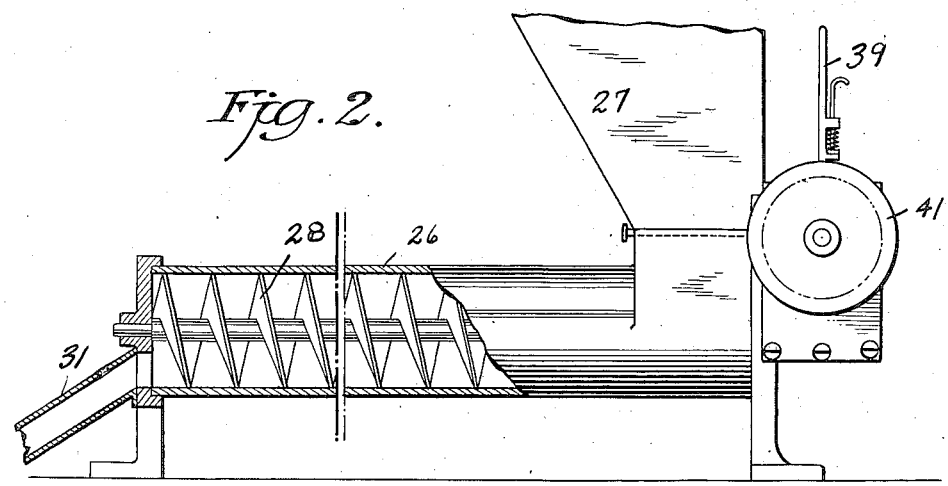
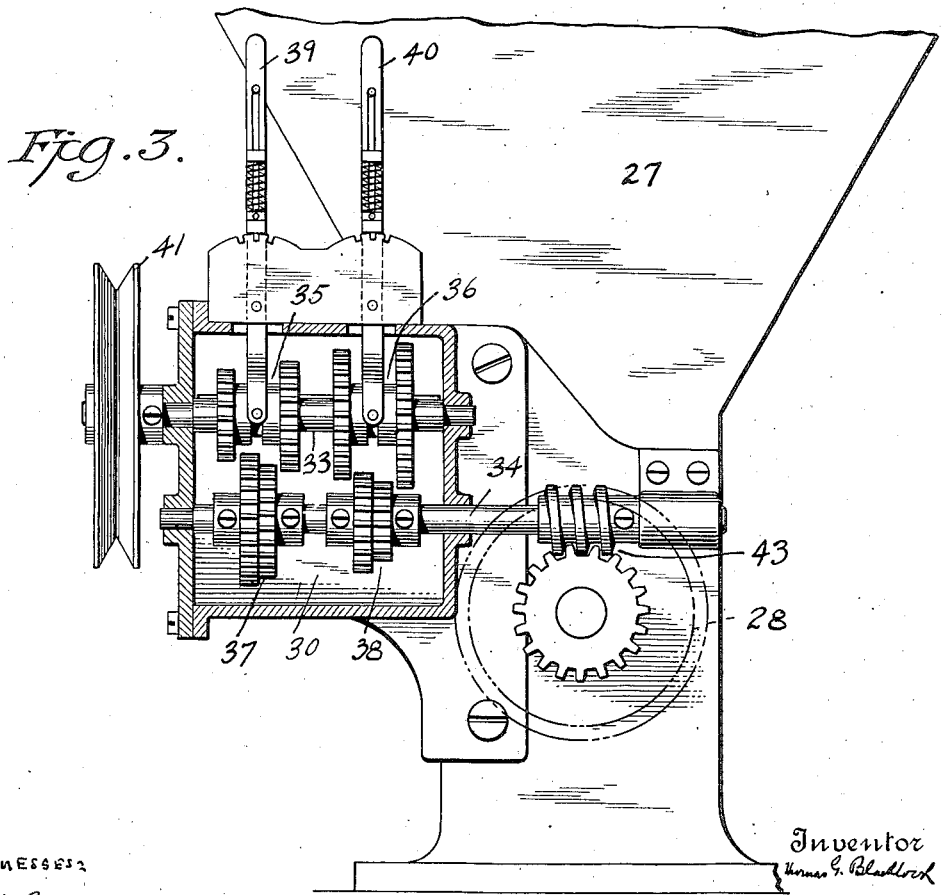

UNITED STATES PATENT OFFICE.

THOMAS G. BLACKLOCK, OF NEW YORK, N. Y., ASSIGNOR TO BLACKLOCK MILLING COMPANY, INCORPORATED, A CORPORATION OF NEW YORK.

APPARATUS FOR TREATING CEREAL PRODUCTS.

1,203,175.   Specification of Letters Patent.   Patented Oct. 31, 1916.

Application filed March 24, 1916. Serial No. 86,385.

*To all whom it may concern:*

Be it known that I, THOMAS G. BLACKLOCK, a citizen of the United States, and a resident of the borough of Brooklyn, city of New York, county of Kings, and State of New York, have invented a new and useful Improvement in Apparatus for Treating Cereal Products, of which the following is a specification.

The object of this invention is primarily to provide an advantageous continuous apparatus for carrying out the process of treating cereal products covered by my application of even date herewith, Serial Number 86384. In accordance with that process the cereal after being ground, or that portion of the cereal which is subject to deterioration, is heated in such manner as to bring out the moisture contained in the particles, and while in this moist or steaming condition is mixed with a suitable proportion of salt, which dissolves in the moisture of the cereal and upon cooling remains adherent thereto, so that the product may thereafter be kept without danger of heating and molding or of being spoiled by eggs and larvæ hatching out and developing therein. The cereal products which I particularly purpose to treat in this way are those consisting of part or all of the bran constituents of wheat, including in this term the epidermal layers, the gluten bearing cell layer therebeneath, the germ, and the skin surrounding the divisions of the endosperm, that is to say the elements rich in nitrogenous and oleaginous content, which are rejected in making refined white flour. Such products are of important food value, but have hitherto been difficult to keep, because the elements peculiar thereto, and particularly the oil content, have caused the cereal to heat and become sour and mildewed, in addition to which the larvæ of the Mediterranean moth have developed therein, producing a large amount of web and rendering the cereal unfit for use. When the products of this character are treated in accordance with my process, however, these drawbacks are overcome.

The process and apparatus may be used in the production of a breakfast food or the like composed exclusively or largely of such bran constituents, or in the manufacture of whole wheat flour and other whole wheat products. In the case of whole wheat products the bran constituents are separated from the starchy endosperm particles before being treated as described and after cooling are re-mixed with the endosperm constituent. Where treated bran constituents are recombined with the endosperm constituent, the treatment of the former has the further advantage of preventing diastasic action upon the starchy elements due to enzyms contained in the bran particles. The process may also be applied to Indian corn products, such as corn meal, the whole of the ground corn being preferably subjected to the treatment.

For carrying out the process I provide a system of closed spouts, conduits and chambers, with conveyers therein, for feeding and conducting the raw cereal product through the stages of its treatment at a definite speed and in definite quantity, one of the chambers being a heater or sterilizer, another a blender, together with means for supplying salt in regulated quantity to the blender, there to mix with the still hot and steaming cereal delivered from the heater. Means are also preferably provided for maintaining a partial vacuum in the heater, and if desired elsewhere in the system, in order to aid in producing the moist or steaming condition of the cereal as the result of moisture given out by the cereal itself. The apparatus may also be used for mixing prepared flour for biscuits, muffins, griddle cakes, etc., for which purpose I provide a by-pass leading from the feed hopper, around the heater to the blender, in addition to which other spouts may also be arranged for the purpose of supplying different cereal constituents to the blender, without passing through the heater. Under such circumstances the salt feeder may be employed to supply other materials than salt to the blender, appropriate change being made in its rate of drive.

In the accompanying drawings: Figure 1 represents a vertical section through the apparatus, parts thereof being in elevation; Fig. 2 is an enlarged view, partly in vertical section and partly in side elevation, of the salt feeder; and Fig. 3 is a front elevation of the salt feeder, with the gear case in section to show the change speed gears therein.

The drawing illustrates a relatively elevated hopper or bin 1 for the reception of the raw cereal product to be treated. From this hopper the cereal passes down a spout 2 in order to reach a heating chamber 3. This piece of apparatus preferably comprises a substantially horizontal cylindrical casing having a heating jacket 4 and containing a spiral conveyer 5, the latter being driven from a suitable source of power, as indicated at 6. After leaving the outlet of the sterilizer the cereal passes through another spout 7 to a blender 8. The feed of the cereal to the heater, as also the feed of the same to the blender, after passing through the heater, is rendered uniform by the provision of other spiral conveyers 9 and 10, operating in substantially horizontal conduit sections 11 and 12, the former interposed in the spout 2 above the inlet 13 of the heating chamber, and the latter in the spout 7 below the outlet 14. These conveyers are driven at a definite rate by gearings 15 and 16.

In the chamber 3 the ground cereal is subjected to a suitable degree of heat for a suitable period at a suitable pressure below atmospheric, the object being to sterilize the product, killing any eggs or larvæ that may be contained therein, and to bring the same to a moist or steaming condition by means of the moisture contained in the cereal particles. This period, it will be understood, depends upon the speed at which the conveyer 5 is driven, and this speed is, of course, subject to variation. The heating is preferably effected by means of steam supplied to the jacket 4 by a pipe 17 and permitted to escape therefrom through the pipe 18, the amount of steam supplied and consequently the degree of heating being regulable by a valve 19. A suitable exhausting pump 20 connected with the interior of the heater by piping 21 having screened inlets 22 constitutes the means for obtaining a pressure less than atmospheric in the heater, and the degree of heat is indicated on a gage 23. In the use of the apparatus a temperature of about 180° F. is suitable, and the drive may be so timed as to subject the cereal particles to these conditions for a period of eight minutes. It is to be understood, however, that I do not limit myself to these precise values, since they may be varied considerably. For example, the degree of fineness of the cereal particles should be taken into consideration, and the higher the temperature the less need be the vacuum, and vice-versa. It is intended, however, that the temperature employed shall be sufficient to sterilize the cereal and to kill eggs and larvæ contained therein, but preferably not so high as to effect an actual cooking.

The blender 8 preferably consists of an upright casing containing a plurality of reversely inclined surfaces over which the material flows, mixing as it does so. In the particular construction shown the casing contains reversely arranged cone baffles of which only two, numbered 24 and 25, are shown. These baffles divide and recombine the flow, and cause the materials to mix intimately. Only the upper part of the blender is illustrated, for lack of space to show more, but it will be understood that the series of baffles which is provided may be of as great an extent as may be necessary for the purpose to be accomplished. Salt is supplied to this blender in uniform and regulable quantity, by means of a feeder 26, shown more in detail in Figs. 2 and 3. This feeder comprises a substantially horizontal cylindrical casing having a hopper 27 containing a spiral conveyer 28 conveniently driven from the shaft 29 of the conveyer 10, through a change speed gearing 30. From the outlet of the feeder the salt passes through a spout 31 to the funnel entrance 32 of the blender, where it joins the stream of moist cereal coming from the heater.

The change speed gearing enables the speed of the conveyer 28 and consequently the rate of delivery of the salt to the blender to be varied exactly in accordance with the needs. It is shown as comprising a pair of shafts 33 and 34, two pairs of gears 35 and 36 slidable on the driving shaft and complementary pairs of gears 37 and 38 fixed on the driven shaft. The slidable gears are movable by levers 39 and 40 in order to engage the gears of different sizes, so as to produce different ratios of drive. With the gearing shown four speeds are obtainable. The driving shaft of the pair is shown as carrying a pulley 41, by which it is driven from the shaft 29 through belting 42, and the driven shaft 34 is shown as connected with the shaft of the conveyer 28 by a worm gear 43.

The amount of salt supplied by the feeder may vary from approximately one-half to approximately two per cent., according to conditions. The salt and the moist cereal are brought into close contact as they pass through the contracted mouth of the funnel 32, and as they pass on through the blender are tumbled and rolled together, the salt sticking to the cereal particles and being partly dissolved in the moisture thereof, with the result that when the product cools the salt remains crystallized on the particles and does not separate therefrom. The salt thus combined preserves the cereal, preventing heating and molding thereof, and the incubation of grubs which develop into cut worms and Mediterranean moth.

A by-pass spout 44 is preferably provided, leading from the bottom of the bin 1 to the inlet of the blender 8, and having a spiral conveyer 45 interposed therein to regulate the feed, this conveyer being shown belted to the shaft 29. A valve 46 enables the cereal in the bin to be directed alternatively into the spout 2, leading to the heater, or the spout 44, leading directly to the blender. This by-pass is chiefly useful when flour or other cereal product is to be mixed with any granular material, as in the case of prepared flours for biscuits, pancakes, etc., such granular material being supplied in appropriate quantity by the feeder 26. Another spout 47 leading into the spout 44 and coming, it will be understood, from another hopper or bin, is illustrative of the fact that the apparatus may be used for mixing different cereals, with each other, or with other materials.

While the action which takes place in the heater 3 is preferably not a cooking operation, the treatment may be so conducted that a portion of the albuminoids contained in the cereal product is coagulated. Such coagulated albuminoids may be removed by a suitable screen, not shown, before the cereal passes to the blender, thus recovering a valuable by-product and avoiding an excess of albuminoids in the cereal.

It will be observed that the system is a closed one throughout, thus guarding against the access of the Mediterranean moth, and for the same purpose I prefer to make the spouts and conduits of metal or metal-lined, since wooden spouts are not impervious to the moth. The apparatus is also preferably so arranged, as illustrated, that the transfer of the cereal from point to point is effected in the main by gravity, thus avoiding the use of elevators which increase the opportunities for entrance to the Mediterranean moth.

What I claim as new is:

1. An apparatus for treating cereal products comprising, in combination, a heating chamber and means for heating the same, means for feeding the cereal product thereto, a blender, means for delivering the heated and still moist cereal product to the blender, and means for supplying salt to the blender.

2. An apparatus for treating cereal products comprising, in combination, a jacketed heating chamber, means for supplying heating fluid to the jacket of the chamber, means for feeding the cereal product to the interior of the chamber, a blender, means for delivering the heated and still moist cereal product to the blender, and means for supplying salt to the blender.

3. An apparatus for treating cereal products comprising, in combination, a heating chamber and means for heating the same, means for feeding the cereal product thereto, and independent means for supplying salt in regulated quantity to the heated and moist cereal.

4. An apparatus for treating cereal products comprising, in combination, a heater and means for supplying the cereal product thereto, a blender and means for transferring the heated and still moist cereal to the blender, said blender comprising a series of reversely inclined surfaces over which the material travels by gravity, and means for supplying salt in regulated quantity to said blender.

5. An apparatus for treating cereal products comprising, in combination, a heating chamber, a closed spout having a substantially horizontal section and a conveyer therein for delivering the cereal product at a definite rate to the heating chamber, means for conveying the cereal product through the heating chamber, a blender connected with the outlet of the chamber, means for feeding the heated and moist cereal at a definite rate to the blender, and means for supplying salt in regulated quantity to said blender.

6. An apparatus for treating cereal products comprising, in combination, a heating chamber containing a conveyer for conducting the cereal product therethrough, a blender connected with the outlet of the heating chamber, conveyers for feeding the cereal product at a definite rate to the heating chamber and after passing through the latter to the blender, and means for feeding salt in regulated quantity to said blender.

7. An apparatus for treating cereal products comprising a system of closed metal-lined spouts, a heating chamber and a blender, conveyers for feeding the cereal product to the heating chamber and afterward to the blender and for progressing it through the heating chamber, and a salt feeder connected with the blender.

8. An apparatus for treating cereal products comprising a hopper, a heating chamber, means for conducting the cereal product from the hopper to the heating chamber, a blender, means for conducting the cereal product from the heating chamber to the blender and means for feeding salt thereto, and a by-pass from the hopper to the blender.

9. An apparatus for treating cereal products comprising, in combination, a heating chamber and means for heating the same, means for maintaining a partial vacuum in the heating chamber, means for feeding the cereal product thereto, a blender, means for delivering the heated and still moist cereal product to the blender, and means for supplying salt to the blender.

10. An apparatus for treating cereal products comprising, in combination, a heating chamber and means for heating the same, means for maintaining a partial vacuum in the heating chamber, means for feeding the cereal product thereto, and means for supplying salt in regulated quantity to the heated and moist cereal.

11. An apparatus for treating cereal products comprising a system of closed metal-lined spouts, a heating chamber and a blender, conveyers for feeding the cereal product to the heating chamber and afterward to the blender and for progressing it through the heating chamber, means for maintaining a partial vacuum in the heating chamber, and a salt feeder connected with the blender.

12. An apparatus for treating cereal products comprising a heating chamber, a source of supply of cereal product connected therewith, a blender and means for conducting the cereal product from the heating chamber to the blender, means for supplying other material to the blender, and a by-pass from the aforesaid source of supply to the blender.

13. An apparatus for treating cereal products comprising a heating chamber, a spout for conducting cereal product thereto, a blender and means for conducting the cereal product from the heating chamber to the blender, means for supplying other material to the blender, and a plurality of other spouts for conducting cereal products to the blender without passing through the heating chamber.

14. An apparatus for treating cereal products comprising a feed receptacle to receive the cereal product, a heating chamber, a blender connected with the outlet of the heating chamber, spouts for conducting the cereal product from the feed receptacle to the heating chamber and to the blender, respectively, a valve for directing the flow into one or other of said spouts, and means for supplying other material to the blender.

15. An apparatus for treating cereal products comprising the combination with a heating chamber, a blender, and means for supplying cereal product to the heating chamber, conducting it therethrough and thence to the blender, of a salt feeder having its outlet connected with the blender and comprising a chamber provided with a hopper and containing a feed device, a source of power, and a change speed gearing for driving said feed device to deliver the salt to the blender in regulable quantity.

16. An apparatus for treating cereal products comprising a heating chamber, means for supplying cereal product thereto, exhausting means connected with the heating chamber, a blender and means for transferring the heated and still moist material to the blender, and a salt feeder connected with the blender.

17. An apparatus for treating cereal products comprising a heater, means for supplying cereal product thereto, a blender connected with the outlet of the heater, a salt feeder connected with the blender, and means for recovering albuminoids coagulated in the heater.

18. An apparatus for treating cereal products comprising a heater, means for supplying cereal product thereto, a blender connected with the outlet of the heater, and a salt feeder connected with the blender.

Dated, March 22nd, 1916.

THOMAS G. BLACKLOCK.